SR
4/29/86     OR     4,585,305

United States Patent [19]
Chazelas et al.

[11] Patent Number: 4,585,305
[45] Date of Patent: Apr. 29, 1986

[54] DEVICE FOR ARRAYING THE ENDS OF OPTICAL FIBERS DISPOSED AROUND AN AXIALLY SYMMETRICAL STRUCTURE

[76] Inventors: Elie C. Chazelas, 11, rue de Verdun S. Germain Laval, 77130 Montereau; Philippe R. P. Cheron, 1, route de Flagy, St Ange le Vieil, 77110 Lorrez le Bocage; Charles L. Martin, 9, rue des Butes Veneux Les Sablons, 77250 Moret S/Loing, all of France

[21] Appl. No.: 457,273

[22] Filed: Jan. 11, 1983

[30] Foreign Application Priority Data
   Jan. 27, 1982 [FR] France .................. 82 01253

[51] Int. Cl.⁴ ..................... G02B 6/38; G02B 6/44
[52] U.S. Cl. ..................... 350/96.21; 350/96.23
[58] Field of Search ........... 350/96.21, 96.22, 96.23

[56] References Cited
U.S. PATENT DOCUMENTS
4,148,559  4/1979  Gauthier .................. 350/96.21
4,361,381  11/1982  Williams .................. 350/96.23

*Primary Examiner*—William L. Sikes
*Assistant Examiner*—Akm E. Ullah
*Attorney, Agent, or Firm*—Lowe, King, Price & Becker

[57] ABSTRACT

The positions of the ends of circularly disposed optical fibers of an optical fiber cable are re-arranged into a substantially linear side-by-side relationship by a device having a solid elongated body with first and second opposite end faces between which extend elongated grooves. Each groove receives only one of the optical fibers. The grooves intersect the first end face in a topological arrangement that is similar to the topological arrangement of the fibers in the cable so that the fibers in the cable can extend into the grooves without crossing each other. The grooves intersect the second end face in a substantially linear topological arrangement. The grooves extend between the first and second end faces in such a manner that they do not intersect.

20 Claims, 11 Drawing Figures 4,585,305

DEVICE FOR ARRAYING THE ENDS OF OPTICAL FIBERS DISPOSED AROUND AN AXIALLY SYMMETRICAL STRUCTURE

BACKGROUND OF THE INVENTION

The present invention relates to a device for arraying, i.e., laying in a planar form, the ends of optical fibers disposed about an axially symmetrical structure.

More particularly, the arraying device repositions the ends of optical fibers equally spaced around a cylindrical cable ring that has been stripped to provide connections to another optical fiber cable so they are parallel on a flat aligning holder.

SUMMARY OF THE INVENTION

The arraying device of this invention comprises an elongated member having substantially longitudinal grooves, each designed to receive a single optical fiber. The grooves are spaced about a first end of the member in a fashion similar to the way the optical fibers are disposed around the axially symmetrical structure. The grooves are aligned along an axis transverse with a second end of the member. This transverse axis defines a plane in which the fibers are to be held in a coplanar and parallel fashion to enable the fibers to be laid on a flat longitudinally grooved holder. The holder is included in a connection device for end to end joining the fibers of two linear arrays.

Means for pushing and pressing the optical fibers into the grooves of the elongated member, such as elastic rings, are slidable about and along the member from the first end to the second end. Once the rings are embedded in bottoms of transversely extending grooves in the second end, the fiber ends are held so they are coplanar and parallel to each other to enable the fiber ends to be applied to the aligning grooves of the flat connection holder.

BRIEF DESCRIPTION OF THE DRAWING

Other features and advantages of the present invention will be apparent from the following detailed description of several preferred embodiments of the arraying device with reference to the corresponding accompanying drawings in which.

DESCRIPTION OF THE PREFERRED EMBODIMENTS

For a better understanding of the invention, reference is made hereinafter to one of the preferred uses of the fiber end arraying device. This use relates to connecting two optical fiber cables in end to end relation. Each of the optical fibers is initially disposed around the cylindrical surface of the axially symmetrical central structure of the cable. The fiber ends of each cable are laid on a flat grooved holder in readiness for being joined end to end with the fibers of the other cable.

Figure 1:
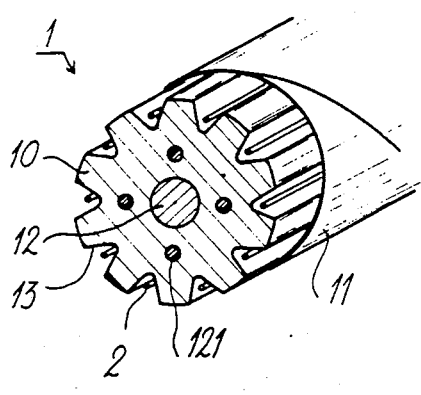
FIG. 1 is a schematic perspective view of an unsheathed end of an optical fiber cable including a grooved core or ring.
Figure 2:
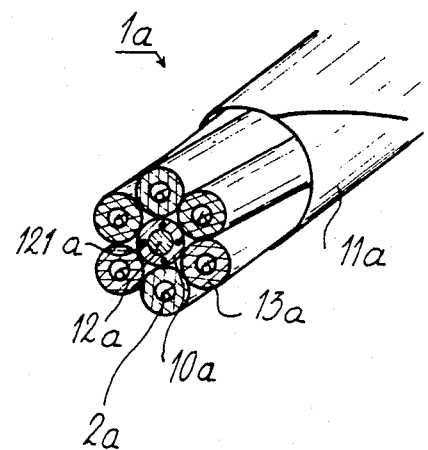
FIG. 2 is a schematic perspective view of an unsheathed end of another cable including tubes, each carrying one optical fiber and disposed around the cable core or ring.

FIGS. 1 and 2 are illustrations of two known optical fiber cable structures with which the invention can be used, although others may be used.

In FIG. 1, the cable 1 comprises an axially symmetrical central structure, such as a longitudinally extending cylindrical core 10, and a peripheral, generally composite sheathing 11 that surrounds the core. The external jacket of this sheathing is made up of wound tape. The core 10 is made, for instance, of plastic. The center of the core 10 encloses a strengthening carrier 12 that includes one steel wire or several twisted steel wires. The outer cylindrical surface of the core 10 has a series of longitudinally extending equi-spaced parallel grooves 13, axially or generally helicoidal arranged. Each of grooves 13 contains one single optical fiber 2. In the illustrated embodiment there are ten parallel grooves.

The cable 1a shown in FIG. 2 also comprises a cylindrical core 10a in which a strengthening carrier 12a, such as a steel wire, is enclosed centrally, and a peripheral sheathing 11a. Inside the sheathing 11a, the cable 1a comprises equi-spaced tubes 13a, twisted about the core 10a. Each tube 13a contains one single optical fiber 2a; in the illustrated embodiment six tubes 13a are provided.

Figure 3:
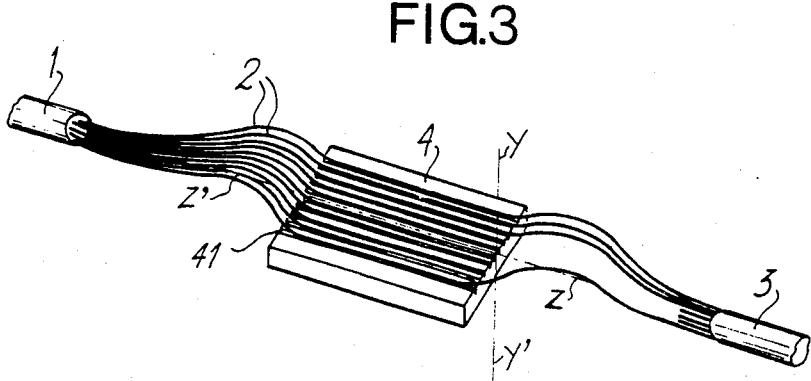
FIG. 3 is a schematic perspective view of the manner in which optical fiber ends from two cables on a flat grooved holder are connected.

Schematically depicted in FIG. 3 are two optical fiber cables 1 and 3 connected together by a thin parallel-epipedal flat holder 4. Generally V-shaped, equi-spaced and coplanar rectilinear aligning grooves 41 are formed in one of the rectangular planar major faces of the flat holder 4. The grooves 41 are parallel to the longitudinal axis Z'Z of the holder. In the embodiment illustrated in FIG. 3, the holder 4 comprises ten grooves 41 that are symmetrical spaced with respect to the median longitudinal vertical plane Y'Y-Z'Z of the holder. Each half-length of each groove 41 receives an end-portion of an optical fiber 2 that is included in a cable 1 and that abuts against the end of a respective optical fiber that protrudes from cable 3. The protruding end of the fiber of cable 3 is received in the other half-length of the groove 41. In the final position, once each cable has been stripped, the fibers have been fanned out and prepared in a linear array by using the arraying device embodying the invention, the ends of the cable fibers are pressed into the bottom of the respective grooves 41 and held there, by bonding for instance.

The fiber arraying device embodying the invention also makes it possible to position the optical fibers, initially disposed around an axially symmetrical structure, such as a cylinder, in array form and to spread the fiber ends out in an equidistant parallel and coplanar fashion.

Figure 4:
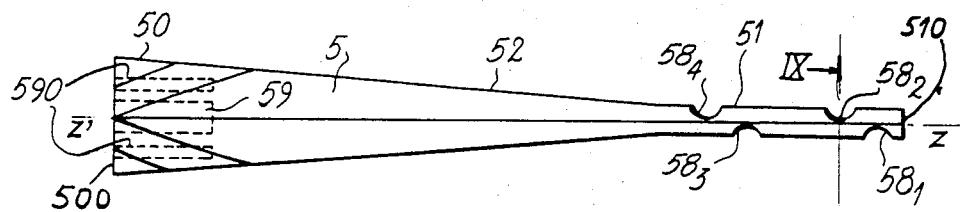
FIG. 4 is a longitudinal side view of the elongated member, referred to as an optical fiber divider, of the arraying device.
Figure 5:
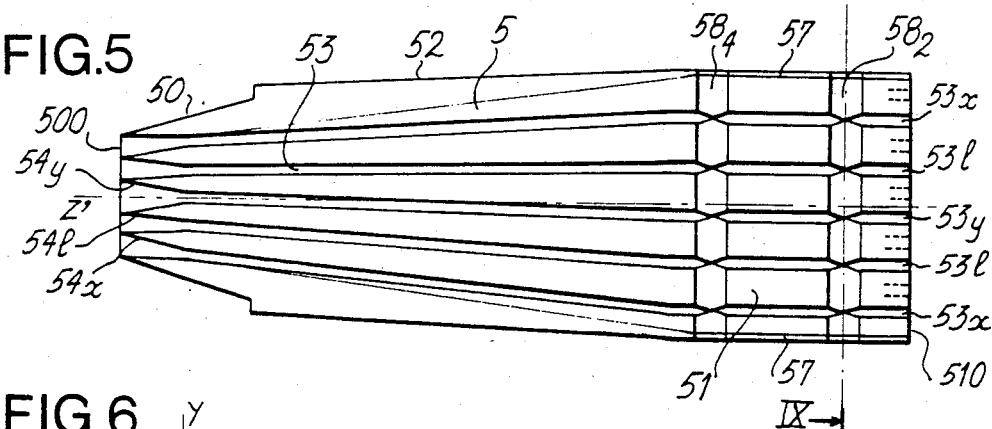
FIG. 5 is a longitudinal plane view of one grooved major face of the elongated member.

The main component of the fiber arraying device includes an elongated, optical fiber divider 5, depicted in FIGS. 4 and 5. The divider 5 extends longitudinally along the longitudinal horizontal median axis Z'Z. A first end 50 of the divider 5, to the left side of FIGS. 4 and 5, has a cylindrical cross-section analogous to that of the grooved ring 10 in the cable 1 that is going to prolong. The other, i.e., second, end 51 of the divider 5, to the right side of FIGS. 4 and 5, has a rectangular cross-section analogous to that of the flat connection holder 4. Between ends 50 and 51 is a longitudinal intermediate portion 52 of the divider that is highly truncated and converges into a rectangular apex at the start of the end 51, having a width greater than the diameter of the cylindrical end 50. The surfaces of the first end 50, the intermediate portion 52, and the two major rectangular faces of the second end 51 carry longitudinally extending grooves 53. The number of grooves 53 is the same as the number of the grooves 13 in the core 10 of cable 1—or the tube 13a in cable 1a—and to the number of the grooves 41 in the holder 4. The separation of the ends of grooves 53 at first end 50 is analogous to that of the grooves 13 in the cable 1—or tubes 13a in the cable 1a—; whereas, the separation of the ends of grooves 53 along the major transverse horizontal axis X'X of the vertical edge 510 of the second end 51 is identical to that of the grooves 41 in the holder 4.

Figure 6:
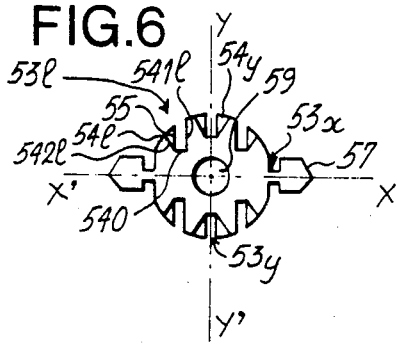
FIG. 6 is a circular cross-section of the first end of the elongated member.

As illustrated in FIG. 6, at the periphery of vertically extending, circular cross-section edge 500 of the cylindrical end 50, the grooves 53 are circularly and equally spaced and commence with various blunted V-shaped profiles 54 over a short length. The planar bottoms 540 of the V-shaped profiles 54 are parallel to the major transverse axis X'X of the second end 51 and are substantially wider than the diameter of an optical fiber 2.

Figure 7:
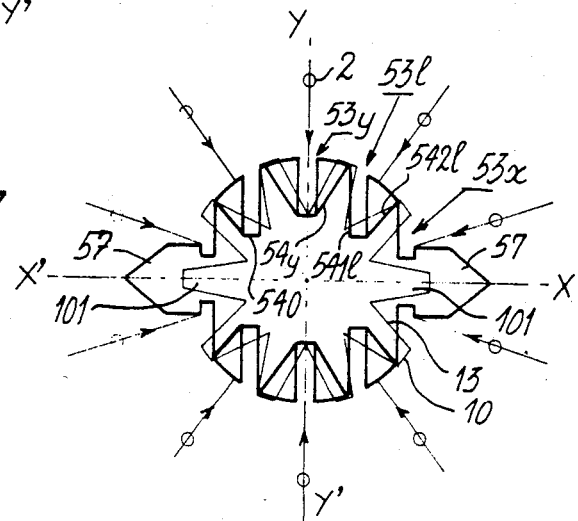
FIG. 7 is a front view analogous to FIG. 6 of the orientation of the grooves in the elongated member compared to those in the cable of FIG. 1.

The separation of the sides of V-shaped profile 54 around edge 500 of the first end 50, having a diameter equal to or substantially greater than that of the core 10 or the average diameter of the core 10a cylindrical assembly, is similar to that of the grooves 13 or tubes 13a. These conditions are seen in FIG. 7 where the faint line delimits a cross-section of the grooved ring 10 in the cable 1 coaxial with edge 500 of end 50.

Groove 53y which terminates in the rectangular portion 51 at the center or in the immediate vicinity of the vertical transverse minor axis Y'Y of the divider 5, has a blunted V-shaped cross-section 54y that is symmetrical about the axis Y'Y. The blunter V-shaped cross-section 54l of lateral groove 53l is asymmetrical, having one side 541l turned towards the axis Y'Y that is parallel with said axis. The other side 542l of the V-shaped cross-section 54l is substantially radial and can be very close to the vertical, i.e., perpendicular to the axis X'X in the region where the lateral groove 53x is near to the axis X'X. In the latter case, groove 53x always has a rectangular profile having sides parallel to the axis Y'Y. Generally speaking, each groove 53 has a blunted V-shaped profile 54 and retracts into a rectangle 55 over a short rear portion of the first end 50, as depicted in FIG. 6. This rectangular profile is contained in the blunted V-shaped profile, as shown in FIGS. 6 and 7. The rectangular profile of each groove 53 is conserved in the intermediate portion 52 and the second end 51.

In the intermediate portion 52 of divider 5, the bottom of each rectangular groove 53 drops progressively until it reaches horizontal median plane X'X-Z'Z at second rectangular end 51. The bottom of each groove 53 moves progressively away from the vertical median plane Y'Y-Z'Z at end 51 since the width of each of end 51 and holder 4 is greater than the diameter of the end 50 and the cable 1 core 10, i.e., the arrangement of tubes 13a of cable 1a.

Figure 8:
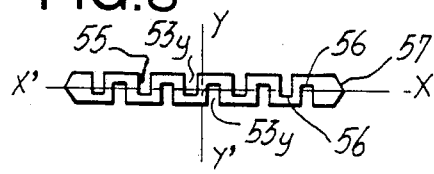
FIG. 8 is a rectangular cross-section of a second end of the elongated member.

Depicted in FIG. 8 is a transverse sectional view of second rectangular end 51 of divider 5. Each major face of the end 50 has half the parallel and longitudinal grooves 53 running across it. The spread of the grooves 53 in the transverse section along the axis X'X is identical to that of the grooves 41 in the holder 4. Grooves 53 have a rectangular profile; alternatively the bottom 56 of grooves 53 can have a substantially semi-circular shape or a V shape. Each of grooves 53, rectilinear at second end 51, has a width substantially equal to the diameter of fiber 2, whereas the depth of the grooves is equal or preferably greater than the fiber diameter, as can be observed from FIG. 9. The bottom 56 of each groove 53 in the second end 51 is on the other side of the axis X'X with respect to the bottom 540 of the groove in the first cylindrical end 50. All the groove bottoms 56 on the same side of the axis X'X are aligned parallel with the axis X'X and are spaced from axis X'X by a distance substantially equal to half of the diameter of each optical fiber 2a. The optical fibers 2, when laid in the groove bottoms 56, are coplanar with the axis X'X. Two grooves 53 that are symmetrical with respect to the axis X'X in the divider first end 50 are adjacent each other in the second end 51. In the second end 51, the space between two adjacent grooves, each running in the direction of one of the major faces of end 51, is equal to that between two grooves 41 in the connection holder 4.

The edges of the second end 51 of the divider 5 include two longitudinal marker protrusions 57, each having a convex V-shaped profile as illustrated in FIGS. 5 and 7; alternatively protrusions 57 can include concave V-shaped grooves. The V-shaped profiles of protrusions 57 are symmetrical about the median plane X'X-Y'Y.

Figure 9:
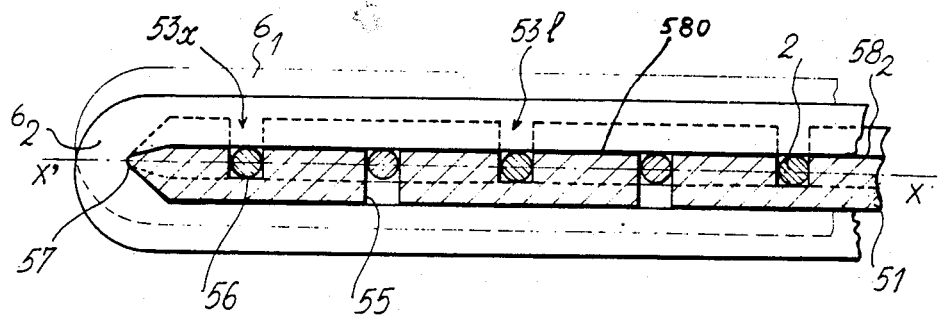
FIG. 9 is a cross-sectional view of a portion of the second end, taken along the line IX—IX, FIG. 11.

As illustrated in FIGS. 4 and 5, first and second major faces of the divider second end 51 respectively include two transversely extending semi-circular grooves $58_1$, $58_3$, and $58_2$, $58_4$, that are parallel to the axis X'X. Grooves $58_1$, $58_2$, and $58_3$, $58_4$ are off-set longitudinally on each of the major sides; the grooves are located at each end of the rectangular portion 51. As depicted in FIG. 9, the bottoms 580 of the grooves $58_1$ to $58_4$ are spaced from major axis X'X by a distance equal to the radius of optical fiber 2. The arraying device comprises four identical elastic toric rings $6_1$ to $6_4$ that are respectively embeddable in the transverse grooves $58_1$ to $58_4$ and which mate with the rectangular cross-section of the second end 51. Rings $6_1$–$6_4$ seat optical fibers 2 into the respective longitudinal grooves 53. The depth of the grooves $58_1$ to $58_4$ is substantially equal to the radius of the cross-section of the rings $6_1$ to $6_4$.

In a further embodiment, each pair of transversely extending grooves such as $58_1$–$58_2$ or $58_3$–$58_4$ is replaced by two transversely extending grooves, each symmetrical with respect to the horizontal plane X'X-Z'Z.

Figure 10:
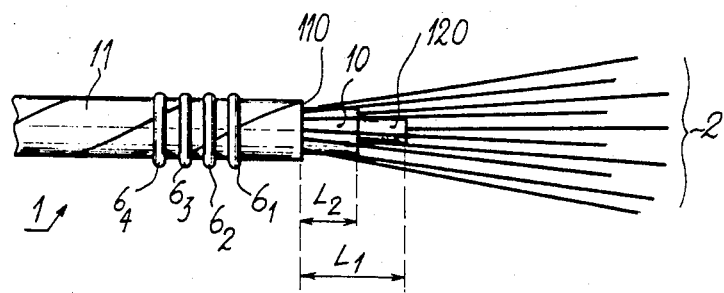
FIG. 10 is a schematic longitudinal view of the cable end illustrated in FIG. 1, wherein the fibers have been cut and fanned out to enable them to be pushed into place using the arraying device.
Figure 11:
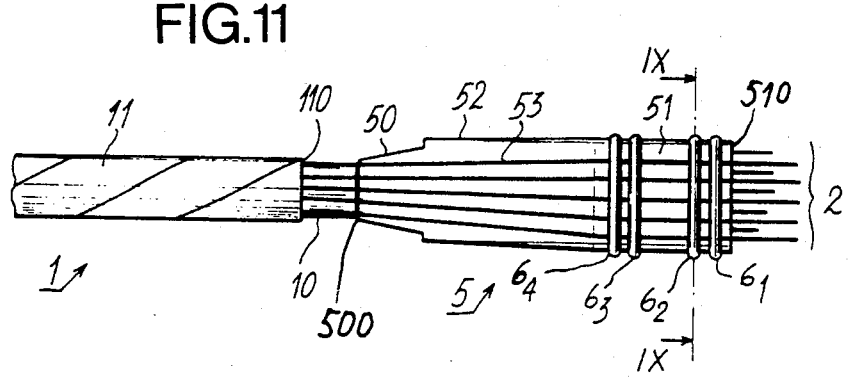
FIG. 11 is a schematic longitudinal plane view of the cable of FIG. 1 after the fibers have been laid in a linear array using an arraying device in accordance with a preferred embodiment of the invention.

In FIGS. 10 and 11 is illustrated the manner in which the arraying device connects together the optical fiber ends of two cables 1 and 3 of the type shown in FIG. 3.

The four elastic toric rings $6_4$ to $6_1$ are worked on over the end of cable 1. The sheathing 11 is stripped off over a length much greater than the length of divider 5 plus the half-length holder 4. The cut end 110 of the sheathing 11 is bonded to the cable core 10. The core 10 and the strength carrier 12 are cut off to a length $L_1$ from the cut end 110 of the sheathing. Trunnion 120 is then formed by cutting a length $L_1-L_2$ off of the end of cable ring 10; trunnion 120 protrudes by a few milimeters from ring 10. The trunnion 120 is coated with adhesive and inserted into an axial hole 59 (FIGS. 4 and 6) recessed in the edge 500 of cylindrical end 50 of divider 5. The divider 5 is next suitably oriented by being rotated about the trunnion 120 such that the marker protrusions 57 are practically aligned with two diametrically opposed peripheral segments 101 of the cable ring 10, as depicted in FIG. 7. The divider 5 is secured between two jaws of a vise—not shown—having concave V-shaped profiles that match the V-shaped protrusions 57 and are tightened around said protrusions 57.

Next, the rings $6_1$ to $6_4$ are slipped to the rear of the cut end 110 of the cable sheathing 11 so they successively slide along dividers, from the end 50 to the respective transversely extending grooves $58_1$ to $58_4$. The sliding action of the first ring $6_1$ automatically engages optical fibers 2 in the respective V-shaped grooves 54 at the rear portion of the cylindrical end 50 and progressively pushes the fibers into the respective divider grooves 53. Once the first ring $6_1$ has reached the rectangular end 51, the optical fibers are close to lying in the horizontal plane X'X-Z'Z. By sitting in the first respective transversely extending groove $58_1$, the first elastic ring $6_1$ presses five fibers against the bottoms 56 of the respective rectilinear aligning grooves 53 of the lower major face of the second end 51. Then the second ring $6_2$ by sitting in the second respective transversely extending groove $58_2$ presses the other five fibers against the bottoms 56 of the respective rectilinear aligning grooves 53 of the upper major face of the second end 51. The other two rings $6_3$ and $6_4$ in the other two transversely extending grooves $58_3$ and $58_4$ play similar roles and contribute to holding the fibers in a linear array over the whole length of the second end 51 in order that said fibers leave the divider in a still more coplanar configuration despite the previous bend of the fibers incurred in the grooves in the intermediate portion 52. The ends of the fibers 2 leaving the divider 5 and thus coplanar with the axis X'X are ready to be laid in the grooves 41 of connection holder 4. Holder 4 is preferably a connection half-holder that is obtained by sawing or breaking a flat holder in half. The sawn half holder is joined to the other half-holder by longitudinal aligning cylindrical pins.

After bonding the fibers 2 to the aligning holder 4, the divider 5 and rings 6 can be left shut inside the cable connection box.

If the strength means of the cable are armatures or stiffeners 121 (FIG. 1) or 121a (FIG. 2), such as steel wires buried in the cable cylindrical core 10 or 10a and around the longitudinal central axis of the cable, respective holes 590 (FIG. 4) are recessed in the divider edge 500 to receive the free ends of these stiffeners.

The divider embodying the invention can be obtained by moulding.

In a second use, the protrusions 57 of the arraying device are slid into two complementary concave V-shaped grooves in a measurement frame to bring the fiber ends of first and second cables into opposed first and second units that enable the cable fiber characteristics to be measured. These units are held in alignment along axis X'X in the measurement frame. The measurement frame units can be photo-emissive means such as diode LED or laser diodes, or photo-sensitive means. In this case, the optical fiber ends are bonded together. The optical fiber ends and divider edge 510 are levelled off and ground. Such measurement apparatus makes it advantageously possible to simultaneously measure all the fibers in a cable to help reduce handling and measurement times.

What we claim is:

1. A device for arraying the ends of optical fibers disposed around an axially symmetrical structure, said device comprising an elongated member having substantially longitudinal exposed grooves extending between opposite first and second ends of said member, each of said grooves being designed to receive a single optical fiber, the grooves being spaced about said first end of said member in a similar fashion to the way the optical fibers are disposed around said axially symmetrical structure, the grooves being aligned along an axis transverse with said second end of said member, said second end having two plane major faces, at least one of said faces including said grooves.

2. The device as claimed in claim 1 wherein said member grooves have a blunted v-shaped cross sectional profile at least in said first end of said member.

3. The device as claimed in claim 1 wherein said member grooves have a substantially rectangular cross sectional profile at least in said second end of said member.

4. The device as claimed in claim 1 wherein said member grooves have a blunted V-shaped cross sectional profile at least in said first end of said member and have a substantially rectangular cross sectional profile at least in said second end of said member, said blunted V-shaped profile of each member groove containing said substantially rectangular profile of said member groove.

5. The device as claimed in claim 4 wherein one of the sides in said blunted V-shaped profile and the sides of said substantially rectangular profile of each member groove are perpendicular to said transverse axis.

6. The device as claimed in claim 1 wherein said first end has a circular cross section, the grooves in said first end of said member being equally spaced about the periphery of the circular cross section.

7. The device as claimed in claim 1 wherein the width of the bottoms of said member grooves is substantially equal to the diameter of said optical fibers.

8. The device as claimed in claim 1 wherein the bottoms of said grooves in said second end of said member are spaced from said transverse axis by a distance substantially equal to the radius of said optical fibers.

9. The device as claimed in claim 1 wherein the bottoms of two of said grooves are symmetrical with respect to the center of said first end of said member, the bottoms of said two grooves being adjacent at said second end of said member.

10. The device as claimed in claim 1 wherein the depth of said grooves is greater than the diameter of said optical fibers.

11. The device as claimed in claim 1 further comprising means slidable about and along said member, from said first end to said second end, for pressing said optical fibers into said member grooves without changing the axial symmetry of the structure.

12. The device as claimed in claim 11 wherein said second end of said member includes at least one substantially transverse groove having a bottom segment spaced from the longitudinal major plane of said member passing through said transverse axis by a distance substantially equal to the radius of said optical fibers, said optical fiber pressing means comprising at least one elastic ring embeddable in said transverse groove.

13. The device as claimed in claim 12, wherein said transverse groove subsists in only one of said major faces of said second end of said member.

14. The device as claimed in claim 12 wherein said transverse groove subsists in said two major faces of said second end of said member.

15. The device as claimed in claim 1 wherein said member comprises two longitudinally extending parallel V-shaped edges.

16. The device as claimed in claim 1 wherein the edge of the first end of said member includes at least one recess for receiving a free end of a strengthening means included in said axially symmetrical structure.

17. A device for changing the positions of the ends of circularly disposed optical fibers of an optical fiber cable to enable the fibers to be re-arranged into a substantially linear side-by-side relationship, the device comprising a solid elongated body having first and second opposite end faces between which extend elongated exposed grooves, each of the grooves being dimensioned to receive only one of the optical fibers, the grooves intersecting the first end face in a topological arrangement that is similar to the topological arrangement of the fibers in the cable so that the fibers in the cable can extend into the grooves without crossing each other, the grooves intersecting the second end face in a substantially linear topological arrangement, the grooves extending between the first and second end faces in such a manner that they do not intersect, the body having a central elongated plane, each groove having a bottom segment that is parallel to the central plane throughout the length of the groove.

18. The device as claimed in claim 17 wherein the second end face intersects opposed top and bottom faces that are parallel to the central plane, adjacent grooves intersecting the second end face along the top and bottom faces in an interdigitated manner.

19. The device as claimed in claim 18 wherein the grooves in the top face extend in the second end face toward the bottom face beyond the central plane and the grooves in the bottom face extend in the second end face toward the top face beyond the central plane.

20. The device as claimed in claim 17 wherein certain of the grooves have a pair of side walls at least one of which is tapered outwardly as the groove extends longitudinally toward the first end face so that each groove has a greater cross sectional area where it intersects the first end face than it does in portions of the body removed from the first end face.

* * * * *